(12) United States Patent
Peller

(10) Patent No.: US 6,882,181 B1
(45) Date of Patent: Apr. 19, 2005

(54) DATA BUS FOR A PLURALITY OF NODES

(75) Inventor: Martin Peller, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/646,006

(22) PCT Filed: Feb. 23, 1999

(86) PCT No.: PCT/EP99/01177

§ 371 (c)(1),
(2), (4) Date: Nov. 13, 2000

(87) PCT Pub. No.: WO99/46898

PCT Pub. Date: Sep. 16, 1999

(30) Foreign Application Priority Data

Mar. 10, 1998 (DE) ......................................... 198 10 294

(51) Int. Cl.[7] .............................................. H03K 19/00
(52) U.S. Cl. .......................................... 326/93; 326/29
(58) Field of Search ............................ 326/93, 86, 29, 326/37–39, 47; 327/108

(56) References Cited

U.S. PATENT DOCUMENTS 6,292,021 B1 * 9/2001 Furtek et al. ................. 326/41

OTHER PUBLICATIONS

Tominaga et al., A Network Architecture with Distributed Switching Function for Optical Fiber Links, Proceedings Computer Networks COMPCON 82 Fall, Sep. 1982, pp. 478–483.*

* cited by examiner

Primary Examiner—James H. Cho
(74) Attorney, Agent, or Firm—Crowell & Moring LLP

(57) ABSTRACT

An arrangement for exchanging data among a plurality of nodes by providing a logical decision gate wherein inputs of the logical decision gate are providing with converted node output signal and wherein the output of the logical decision gate provides signals to each of said nodes through a respective signal converter. The signal converter outputs electrical signals to said logical decision gate.

4 Claims, 1 Drawing Sheet

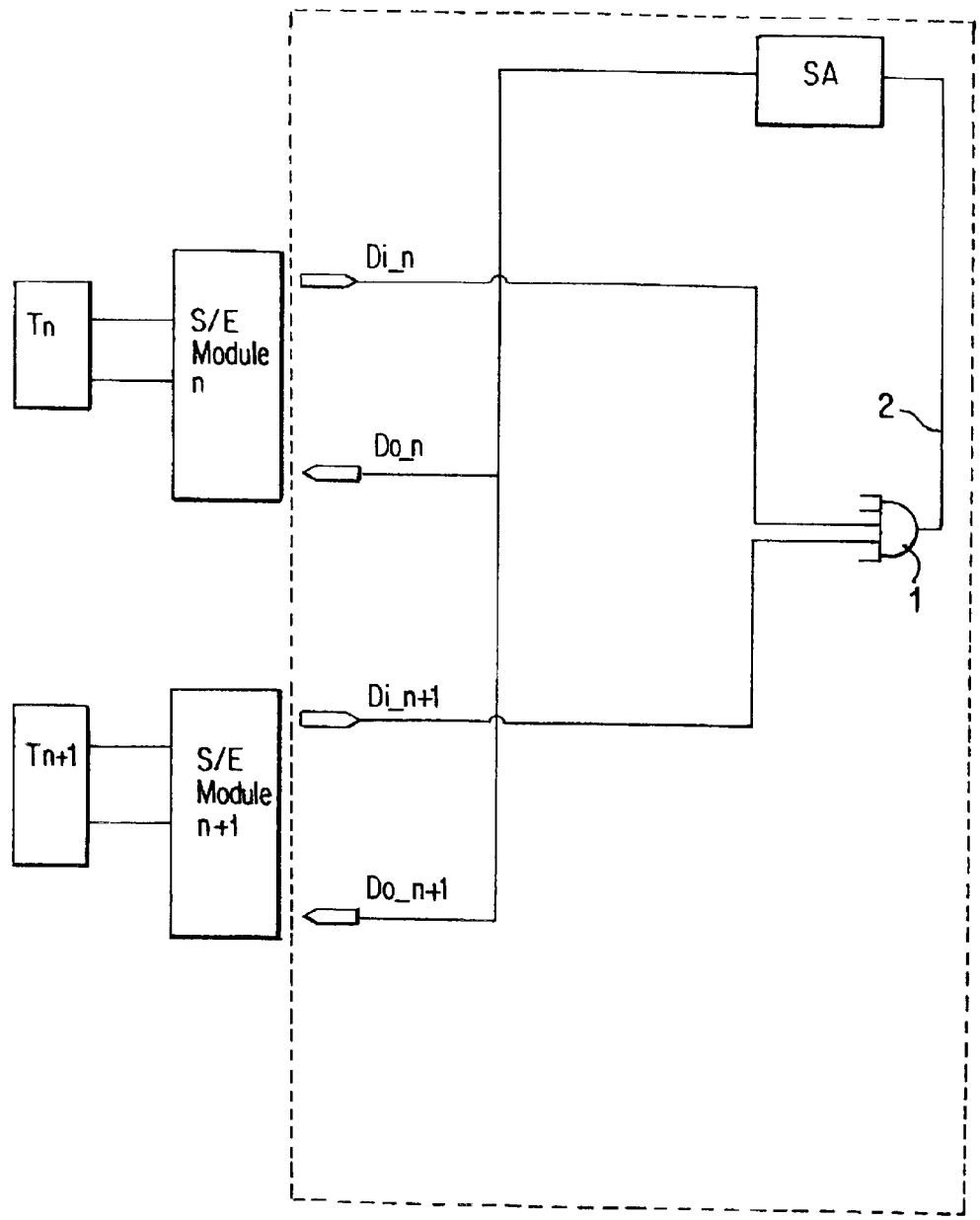

DATA BUS FOR A PLURALITY OF NODES

CROSS-REFERENCE TO RELATED APPLICATIONS

This application is related to co-pending applications Ser. No. 09/623,897, filed Sep. 11, 2000; Ser. No. 09/623,896, filed Sep. 11, 2000; Ser. No. 09/623,852, filed Oct. 30, 2000; Ser. No. 09/623,853, filed Nov. 8, 2000; Ser. No. 09/646,006, filed Nov. 13, 2000; Ser. No. 09/623,898, filed Nov. 16, 2000; and Ser. No. 09/623,894, filed Nov. 21, 2000.

This application claims the priority of German Patent Application 198 10 294.1, filed Aug. 10, 1998 and PCT/EP99/01177 filed Feb. 23, 1999, the disclosures of which are expressly incorporated by reference herein.

The invention relates to a star-shaped data bus for a plurality of nodes which exchange data with one another over at least one electric line. The circuit-technological realization of a data bus of this type is known in the form of an open collector circuit. An open collector circuit has the disadvantage that at high rates of transmission and many bus nodes a relatively small resistance value must be used as collector resistance in order to achieve a sufficient steepness of the edge of the signal information present in pulse form. This leads to high currents and the necessity of use of power transistors and power resistors as well as high power losses.

The objective of the invention is to provide a data bus of the type stated initially which makes possible interference-free bus communication with low circuit-technological expenditure even in the case of a large number of bus nodes.

The central element of the data bus according to the invention is the logical decision gate having inputs for receiving the signal outputs of the bus nodes. The logical decision gate requires for no expensive signal form processing devices. It transmits the signals unchanged in their form. Also the required power consumption is low even in the case of a large number of nodes.

The invention may be used with nodes which supply electrical output information as well as with nodes which generate optical output signals. The optical nodes are connected via opto-electric transducers on the data bus so that the signal outputs of the nodes, via each transducer of this type, are fed to the logical decision gate and the output of the logical decision gate is fed, via a common electric-optical transducer or else via individual transducers of this type, to the inputs of the nodes.

For a data bus which is configured as an open collector circuit it is known to provide signal form processing devices (cf. U.S. Pat. No. 5,684,831). Therein a device of this type is provided for each node. The configuration according to the invention for the data bus with a logical decision gate now permits reducing the circuit-technological expenditure drastically. It is only necessary to connect a single signal preparation circuit between the logical decision gate and the inputs of the nodes. This signal preparation circuit models the output signal of the logical decision gate with regard to pulse form. This can be accomplished with an adjustment of the form of the output signal to the form of the input signals or by an adaptation as is described in U.S. Pat. No. 5,684,831. According to this method, the leading edges are flattened in order to be able to distinguish the usable signal from high-frequency interference signals with extreme edge steepness.

Finally, additional embodiments of the invention use additional logical decision gates which can be disposed between the output of the signal preparation circuit and at least one of the nodes. It is when possible to separate certain sections of the data bus, as needed, in order, for example, to separate a faultily functioning bus node or else to set several bus nodes into Sleep mode.

Other objects, advantages and novel features of the present invention will become apparent from the following detailed description of the invention when considered in conjunction with the accompanying drawings.

BRIEF DESCRIPTION OF THE DRAWINGS

The single FIGURE shows schematically the layout of the data bus according to the invention which achieves reliable bus communication for a plurality of bus nodes with low circuit-technological expenditure.

DETAILED DESCRIPTION OF THE PREFERRED EMBODIMENT

A data bus serves to connect the nodes to one another, which supply optical information. The output of the nodes (for the sake of comprehensibility two nodes $T_n$ and $T_{n+1}$ are indicated) are fed to inputs of opto-electric signal transducers $S/E_n$ and $S/E_{n+1}$ as input signals. The electric signals ($Di._n$, $Di._{n+1}$) output from these transducers are linked with an AND gate 1. The number of inputs to the gate corresponds to the number of the bus nodes. The output 2 of the AND gate 1 drives all the inputs ($Do_n$, $Do_{n+1}$) of the transducers $S/E_n$ and $S/E_{n+1}$ which supply optical signals in the form of a pulse to the nodes via optical transmission segments.

In this manner each node receives all the information are issued by the other nodes as well as its own information.

The AND gate 1 has a significantly lower power consumption than the open collector circuit mentioned initially.

A signal preparation device SA at the output of the AND gate 1 eliminates, distortions of signal form, such as can arise through opto-electrical transducers ($S/E_n$ and $S/E_{n+1}$). For example, NRZ (non-return-to-zero) -coded signals which experience a distortion of up to 30% signal length through the transducer S/E can be brought into a form without pulse distortion.

For the signal preparation in the device SA, for example, the same sampling process can be used which is used for the individual nodes. It is also possible to use a special signal preparation process which takes into account the special auxiliary conditions in the data bus. Thereby data transmission is significantly more robust. It is possible to filter out brief glitches. The demands on the sampling process in the individual nodes can be set lower or the tolerance with respect to pulse distortion grows on one transmission segment. The sampling process is clearly less susceptible to quartz jitter. For the same robustness quartzes with lower frequency and less cost can be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus for a plurality of nodes which exchange data with one another over at least one electrical line, said data bus comprising:

a plurality of data exchange modules each having a first input for receiving input data from respective ones of said plurality of nodes and providing a corresponding electrical output signal;

a logic decision gate having a plurality of inputs with each input receiving said respective electrical output signal wherein a single output of said decision gate is connected to a second input of each of said plurality of data exchange modules; and a signal preparation circuit positioned between said logic decision gate and said second input of said data exchange modules wherein said signal preparation circuit includes means for adjusting the output signal of said logic decision gate to a pulse form.

2. The data bus according to claim 1, wherein each of said data exchange modules comprises an opto-electrical transducer wherein an output of said nodes is connected through an optical transmission element to said opto-electrical transducer.

3. The data bus according to claim 1, further comprising additional logic decision gates positioned between an output of said signal preparation circuit and one of said nodes.

4. An improved method of exchanging data among a plurality of nodes, comprising the steps of:

providing a logical decision gate having a plurality of inputs corresponding to the number of plurality of nodes;

outputting information from each of said plurality of nodes;

converting said information into perspective electrical outputs;

providing said electrical outputs to said inputs of said logical decision gate; and providing an output of said logical decision gate transforming said output and providing said transformed output to an input of each of said nodes; and providing a signal preparation circuit between said logic decision gate output and said plurality of nodes in order to provide a pulse formation adjustment of said output signal.

* * * * *